Sept. 12, 1944.　　　M. C. SCHWAB　　　2,358,257
PROJECTILE DEFLECTOR
Filed July 28, 1941　　　2 Sheets—Sheet 1
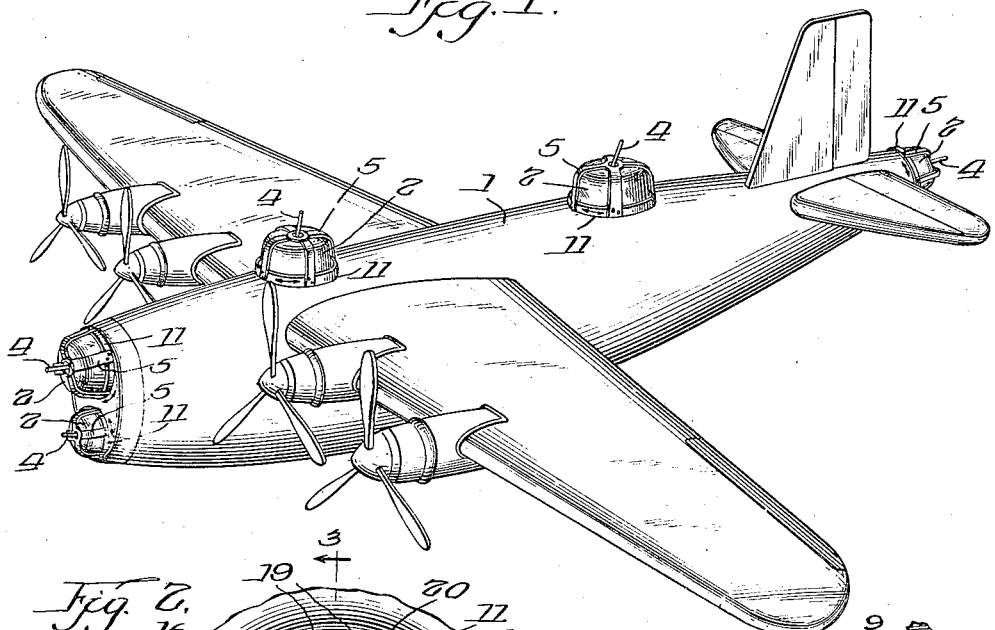

Sept. 12, 1944.  M. C. SCHWAB  2,358,257
PROJECTILE DEFLECTOR
Filed July 28, 1941  2 Sheets-Sheet 2
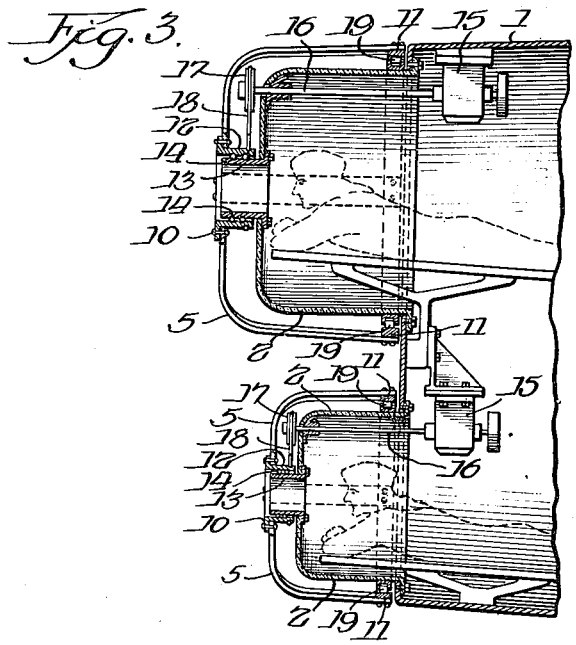
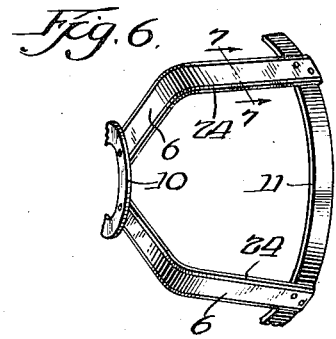
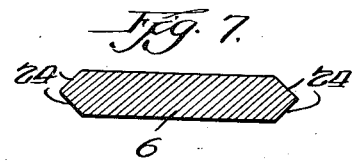
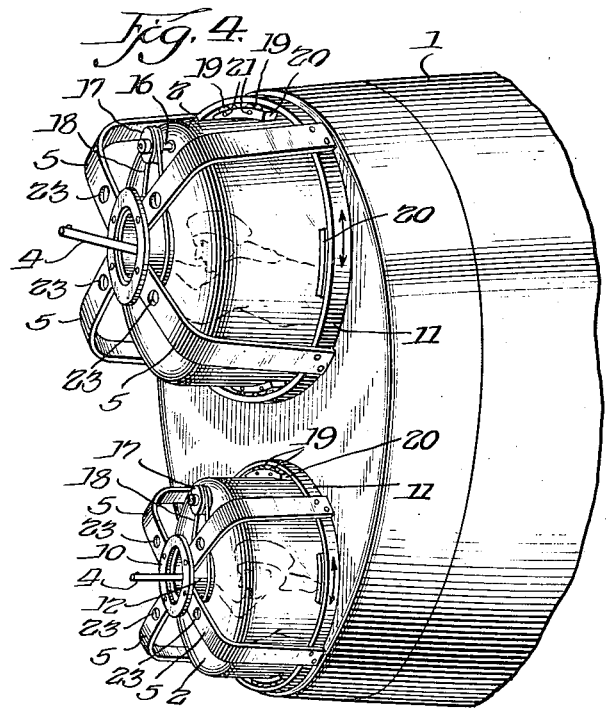
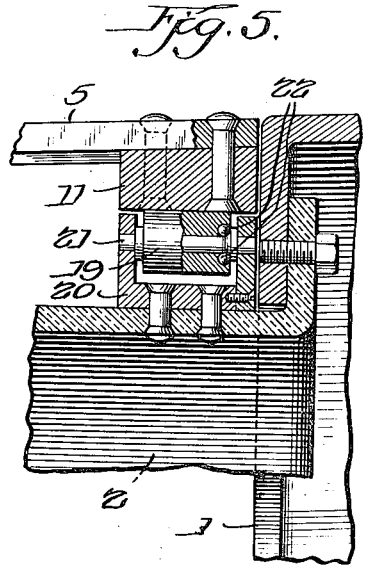
Inventor:
Martin C. Schwab
By Albert I. Kegan
Atty.

Patented Sept. 12, 1944

2,358,257

UNITED STATES PATENT OFFICE 2,358,257

PROJECTILE DEFLECTOR

Martin C. Schwab, Chicago, Ill.

Application July 28, 1941, Serial No. 404,369

4 Claims. (Cl. 89—36)

This invention relates to improvements in military vehicles and fortresses, and more particularly to aircraft constructed to deflect projectiles which otherwise would strike the observation "blisters" or other vital portions of the craft. More specifically, the invention relates to motor-driven scanning screens arranged to enclose a vulnerable region and adapted to rotate so rapidly as to present virtually a solid barrier to machine gun bullets and the like, but which, because of the rapid rotation of the members thereof, are transparent to observe located within the protected region.

It will be apparent that the instant invention has a broad field of usefulness in conjunction with the widest variety of look-out posts and military vehicles. I find it convenient, however, to describe the invention in connection with aircraft structures, it being understood, however, that such limited fields of specific application are employed herein purely for purposes of illustration, and that the method and the machinery of the present invention are adapted to be utilized in a wide variety of circumstances.

Many casualties occur in military aircraft due to bullets aimed at observers or gunners in their exposed compartments. It is necessary that the view from these compartments be unimpeded. Similarly, the propellers, motor housings, and control means are favorite targets of enemy gunners.

The gist of the present invention resides in surrounding the aforementioned vulnerable locations with a scanning screen having impelling members. The scanning screen is driven by a suitable motor through the necessary connections and is rotated so rapidly that there is a large probability that projectiles which otherwise would strike the protected region will strike the impeller blades and be deflected away. The total area of the impeller blades is but a small fraction of the area being protected thereby. Accordingly, the ratio of transparent area to opaque area is very large, so that when the projectile deflector is rotated with sufficient rapidity, it is possible to see clearly therethrough.

It is a principal object of the present invention to provide a whirling cage adapted to surround a vulnerable object or portion thereof and to insulate the same from missiles without impairing the visibility therethrough.

Another object is to provide an aircraft structure having the vital points thereof protected by rapidly rotating deflecting devices which present an effective barrier to enemy projectiles but which nevertheless are substantially transparent to persons located inside the aircraft.

Yet another object is to provide a construction which will minimize injury to the personnel in an aircraft without substantially diminishing the visibility of the environment to those within said craft.

Other objects are to provide machinery of maximum simplicity, sturdiness, dependability and ease of use for the purposes herein described.

The foregoing and such other objects, advantages, and capabilities as may appear herein or be pointed out as this description proceeds, or as are inherent in the present invention, are illustrated in the accompanying drawings in which:

Figure 1 is a perspective view of a military airplane equipped with the projectile deflectors of the present invention.

Figure 2 is a front elevational view of a portion of the fuselage of an airplane constructed according to the present invention.

Figure 3 is a cross-section taken approximately on line 3—3 of Figure 2.

Figure 4 is a somewhat enlarged fragmentary perspective view of the portion of the fuselage illustrated in Figures 2 and 3, and shows two of my projectile deflectors mounted so as to protect two gunners' observation towers situated within said fuselage.

Figure 5 is a detail cross-sectional view of one form of bearing construction which may be employed at the outer periphery of my improved projectile deflector.

Figure 6 is a fragmentary detail perspective view of a modified form of the impeller subassembly of my improved projectile deflector, the blades of said impeller portion being provided with beveled edges.

Figure 7 is an enlarged cross-sectional view taken on line 7—7 of Figure 6.

Figure 8 is a fragmentary detail perspective view of a further modification of the impeller subassembly of my improved projectile deflector, the blades of said impeller subassembly being provided with transparent panels to increase the visibility therethrough.

Figure 9 is an enlarged cross-sectional view taken on line 9—9 of Figure 8.

Like reference characters are used to describe similar parts in the drawings and in the description of the invention which follows.

Referring now more particularly to the drawings Figure 1 discloses a military airplane 1 having transparent "blisters" 2 protruding therefrom and serving as observation towers, gun turrets, or the like. Protruding from said blisters are machine guns 4, cannon, photographic equipment or the like. Surrounding said blisters are the impeller subassemblies 5 of the projectile deflectors comprising the principal subject matter of the instant invention.

As is apparent from Figures 1, 2, 3, and 4, my improved projectile deflector comprises a hollow stub shaft 13 fixed to the framework of the blister 2 and serving as a port through which a gun may be protruded, a hub 12 adapted to rotate upon hollow shaft 13, an annular flange 10 upon said hub 12, an annular collar 11 remote from hub 12 and coaxial therewith (said collar 11 surrounding the base of said blister 2), and a plurality of impeller blades 5 each joined at one end to the flange 10 and at the other to the collar 11. Suitable means for minimizing friction, such as the ball bearings 14, are placed between the stub shaft 13 and the hub 12. The blades 5 and the annular rings 10 and 11 constitute the impeller subassembly. As is shown in Figure 3, the ball bearings 14 rest in a race formed by grooves in the stub shaft 13 and the hub 12. It will be understood that said ball bearings 14 are normally of substantial dimensions, having a diameter, for example, of the order of 2 inches. The ball bearings thus serve to lock the impeller subassembly to the fuselage, and to retain said subassembly in position on its bearings. Alternatively, or in addition, other common engineering expedients, such as flanges on the hollow shaft 13, the hub 12, or the annular collar 11, may be utilized to retain the impeller subassembly in position.

Said impeller subassembly may be rotated by any suitable mechanism, exemplified by, but not limited to, the gasoline engine 15, the drive shaft 16, the pulley 17, and the endless belt 18. Said endless belt 18 surrounds the hub 12 and rotates the same. It will be apparent to those skilled in the art that any suitable source of power may be substituted for the gasoline engine 15, and that any suitable driving arrangement may be substituted for that illustrated in the drawings herein. It will also be appreciated that appropriate control means will be provided whereby said sources of power may be turned on and off at the will of the occupants of the vehicle.

The power source and driving connections ordinarily will be protected by the impeller subassembly, as is clearly shown in Figures 3 and 4.

Sufficient clearance is provided between the annular supporting collar 11 and the fuselage of the aircraft 1. Said annular collar 11 may be supported by the blister structure 2, it being understood that suitable roller bearings 19, or other friction minimizing devices, are interposed between the supporting stationary blister structure 2 and the rotatable ring 11.

Figure 5 illustrates one operative arrangement for supporting the impeller subassembly at the outer periphery thereof. The annular housing 20 is fixed to the blister structure 2. Mounted in said housing 20 are a plurality of shafts 21. Upon each of said shafts is a rotatable roller bearing 19, capable of being rotated upon the shaft 21. The ball bearings 22 minimize the friction between the roller bearing 19 and the shaft 21. The entire bearing subassembly more or less closely resembles the conventional roller skate.

The impeller portions normally are fabricated of forged steel or other tough impact resisting material. If desired, said impeller blades may be perforated as shown at 23 for convenience in assembling; or, as shown in Figure 6, that may consist of continuous bands of metal.

Figure 6 illustrates an impeller subassembly having blades 6 with beveled edges 24. The shape of the blades 6 is emphasized in Figure 7. Said beveled edges reduce wind resistance when the impeller subassembly is being rotated, and further provide cutting edges adapted to chop up bullets or shrapnel which may be struck by said beveled edges 24 when said impeller subassembly is rotating rapidly.

Figure 8 illustrates a further modification of the impeller subassembly, in which the blades 8 are provided with transparent panels 25. Said panels may consist of any transparent material, such as plastic, glass, "Celluloid," mica, or the like. The panels 25 increase the visibility through the rotating impeller subassembly without increasing the wind resistance, as would be the case if said impeller blades 8 had slots therein instead of transparent panels.

Figure 9, which is a cross-section on line 9—9 of Figure 8, brings out clearly the structure of the impeller blades 8.

All the projectile deflectors shown in Figure 1 are constructed substantially as above described, and all operate in the same manner.

Having described the construction of my improvement, the operation thereof will now be explained in detail.

When the aircraft is in enemy territory, observers or gunners normally will be stationed in the various observation chambers, as is indicated in Figures 3 and 4. The motor 15 will not be running, or, if running, will not rotate the impeller blades, a suitable clutch (not shown) being provided to permit idling of the motor. When an enemy craft, or enemy anti-aircraft fire, is encountered, or whenever danger is anticipated, the impeller subassembly is set in rotation by starting the motor 15, or by engaging an appropriate clutch.

The projectile deflector is designed to rotate at high rates of speed. The result is that the surface generated by the rotation of the impeller subassembly acts substantially like a solid body so far as projectiles reaching it from outside are concerned. A projectile which strikes the whirling deflector will be thrown off due to the centrifugal force generated by the deflector. For this reason, the impeller blades are far more effective than stationary armor.

While the observer within the "blister" aims his weapon or camera through the hollow stub shaft or tube 13, it is also necessary for him to keep a sharp lookout in all directions, which he does by scanning through the wall of "blister" 2.

As far as he is concerned, the whirling deflector operates very much like a scanning screen. Since the ratio of the area actually occupied by the impeller blades is relatively small in proportion to the area enclosed and patrolled thereby, the rapidly whirling impeller blades offer but little impedance to vision, because of the physiological phenomenon of the persistence of visual images.

Once an enemy aircraft or other objective has been spotted, the aircraft will be maneuvered so that the gun may be directed thereat, and the crew member will sight his weapon through the hollow shaft 13, thus obtaining vision even more unimpeded than if he were observing through the whirling projectile deflector.

Accordingly, the present invention enables the observer or gunner to continue his work in a protected environment. Since a large proportion of the casualties occurs in the observation towers and gunnery posts, it will be seen that my invention is an effective means of conserving human life and of maintaining the military effectiveness of the offensive or defensive device of which it is a part. Furthermore, the increased confidence and sense of security which it gives to the soldier doubtless contributes to improve his morale and increase his efficiency. A machine gun, cannon or aerial camera may be aimed and operated through the port in the "blister" and the aperture in the annular ring 10 at the center of the projectile deflector, since, as has been stated previously, the port and the aperture in the deflector are aligned for this very purpose.

When the danger zone has been traversed, rotation of the impeller subassembly is discontinued. For this reason, it is desirable to have the various projectile deflectors on the same craft independently operated. When the shift is being attacked from the rear, for example, the projectile deflectors in the nose ordinarily may be allowed to remain at rest.

While the invention has been described with particular reference to protecting observation positions, it is apparent that the invention may be employed to shield any vulnerable part of the aircraft.

While I have illustrated my invention by describing the details of an operative embodiment thereof, and have explained the utilization of said embodiment in connection with aircraft, it will be apparent to those skilled in the art that the invention may be incorporated into numerous other mechanisms, and a wide range of modifications and variations therefrom may be made without departing from the scope of my invention.

Thus it will be seen that I have fully disclosed a new construction for fortresses and observation posts, as well as for aircraft and other military vehicles, characterized by the provision of projectile deflectors over the most vulnerable portions thereof, said deflectors being adapted to be rotated at high rates of speed to provide what amounts to transparent armor which is as tough and impermeable as steel with respect to missiles striking it, and which is as transparent as glass to observers within the protected region.

Having thus described my invention and illustrated its utility, I claim—

1. A projectile deflector for aircraft, comprising a hollow shaft serving as a gun port, a flanged hub adapted to rotate upon said shaft, an annular ring remote from said hub and coaxial therewith, a plurality of bevel-edged angular blades, each of said blades being joined at one end to the flange on said hub and at the other end to said annular ring, means for rotatably supporting said annular ring, means for minimizing friction between said supporting means and said annular ring, and means operatively connected to said hub for whirling said projectile deflector upon its axis of symmetry.

2. In a projectile deflector as defined in claim 1, transparent panels in said blades to increase the visibility through said projectile deflector without increasing the wind resistance thereof.

3. An armored transparent observation chamber comprising a dome portion having transparent walls, a tube projecting therethrough, a hub rotatably mounted on said tube outside said dome portion, a collar encircling said dome portion, a plurality of blade-like chopping members connecting said hub and said collar, and means for spinning said chopping members.

4. In aircraft having at least one observation chamber, a tube protruding through the wall of said observation chamber, an impeller assembly shielding said observation chamber, and means for spinning said assembly about its axis of symmetry, said assembly comprising a hub rotatably mounted on said tube, a collar encircling said observation chamber, and a plurality of blade-like members extending from said hub to said collar on the outside of said observation chamber.

MARTIN C. SCHWAB.